Nov. 1, 1960  J. B. JENKINS  2,958,093
PATTY MOLDING DEVICES
Filed May 16, 1958  2 Sheets-Sheet 1
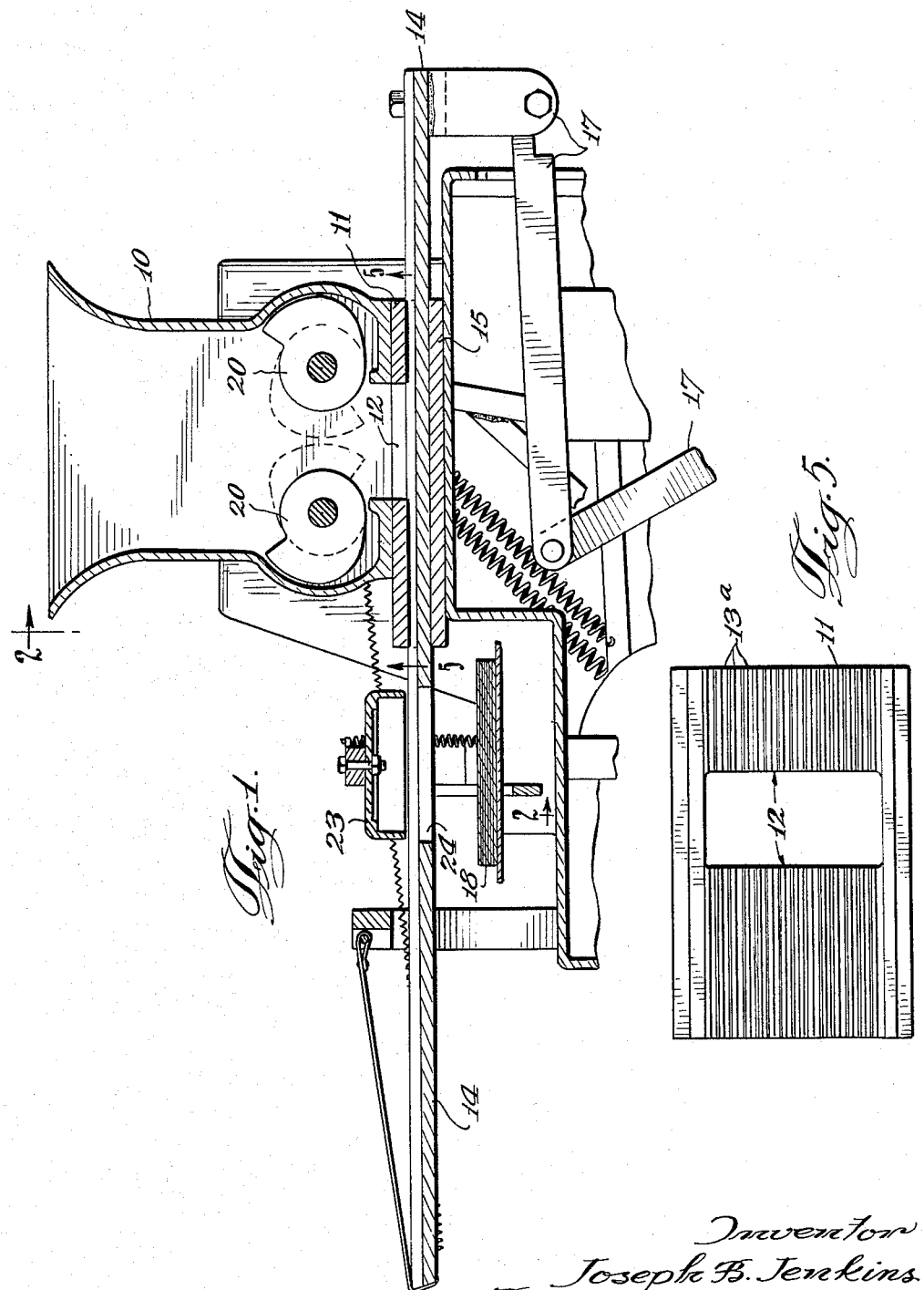
Inventor
Joseph B. Jenkins
By Carl C. Batz
Attorney Nov. 1, 1960   J. B. JENKINS   2,958,093
PATTY MOLDING DEVICES
Filed May 16, 1958   2 Sheets-Sheet 2
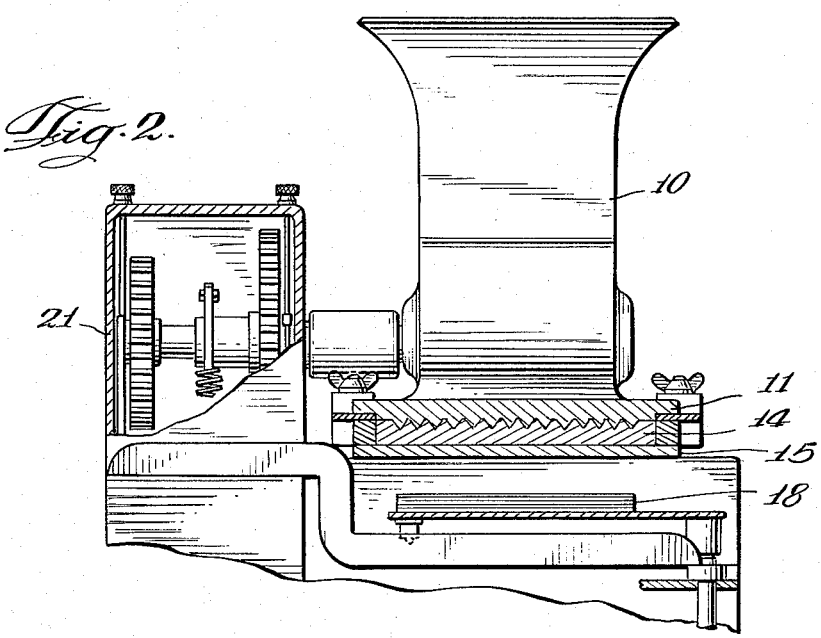
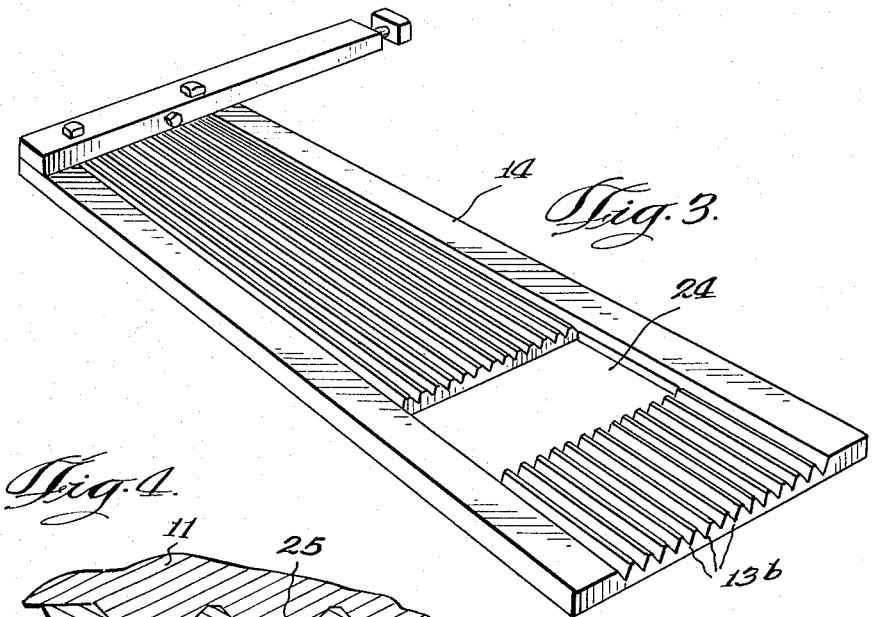
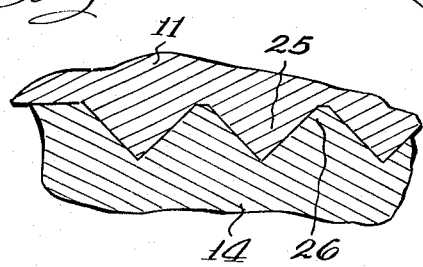
Inventor
Joseph B. Jenkins
By Carl C. Batz
Attorney

2,958,093
PATTY MOLDING DEVICES

Joseph B. Jenkins, Eau Claire, Wis., assignor to Armour and Company, Chicago, Ill., a corporation of Illinois Filed May 16, 1958, Ser. No. 735,798

1 Claim. (Cl. 17—32)

This invention relates to an improvement in devices for molding plastic materials, such as ground meat, to form articles such as meat patties. The invention relates more particularly to patty molding devices in which there may be formed patties of substantially uniform size and thickness having a non-planar surface configuration on one surface thereof.

It is an object of this invention to provide an improved device of the character described in detail in U.S. Patent No. 2,530,062 which may be used for molding articles from plastic materials such as ground meats. In such devices there is provided a hopper for the plastic material, a slidable mold plate adapted to receive a portion of the plastic material from the hopper and form a patty from such material, means for sliding or reciprocating the mold plate beneath the hopper, and apparatus for removing the patty from the mold.

It is a particular feature of the invention to provide a device of the general character described in the above-mentioned patent wherein there is provided a slidable mold plate having a plurality of grooves in the surface thereof which is in contact with the hopper and in which there is also provided a hopper having a plurality of grooves in that surface which is in contact with the slidable mold plate, thus making it to conform to the adjacent surface of the mold plate. By means of this improved apparatus there may be formed meat patties of substantially uniform size and thickness which have a desirable non-planar surface configuration and enlarged surface area.

Other features and advantages of the invention will become apparent from the following description taken in conjunction with the accompanying drawings in which Fig. 1 is a fragmentary elevation, partly in section, of a patty molding machine incorporating the improvements of this invention.

Fig. 2 is a fragmentary, cross-sectional view taken on view line 2—2 of Fig. 1.

Fig. 3 is a perspective view of the improved mold plate of the invention showing the plurality of the grooves in the surface of the plate.

Fig. 4 illustrates the relationship of the grooves of the mold plate and of the hopper.

Fig. 5 is a perspective view of the lower surface of the hopper of the invention taken along view line 5—5 of Fig. 1 which is generally conformed to the surface of the mold plate.

In the drawings there is illustrated a hopper 10 adapted to contain a supply of plastic material such as ground meat. The hopper 10 has a bottom portion 11 with a bottom opening 12. The bottom portion 11 of the hopper 10 is provided with a plurality of grooves 13a as illustrated particularly in Figs. 2 and 5. There is also provided within the hopper some means of forcing the plastic material, e.g. ground meat, through the bottom opening into the mold opening 24 of the mold plate 14; such a means is designated by the numeral 20 and is powered by the assembly 21. The mold plate 14 is movably mounted upon the supporting member 15. As illustrated particularly in Fig. 1 there is also provided a means for sliding or reciprocating the slide plate 14; such a means for reciprocating the slide plate is designated generally in Fig. 1 by the numeral 17. In Fig. 1 the mold plate 14 is in the position for discharging the meat patty from the mold plate opening 24 on to a stack of paper sheets 18. As illustrated particularly in Figs. 2, 3 and 4, the mold plate has a multiplicity of grooves 13b which generally correspond to the grooves 13a of the bottom of the hopper 10. The relationship of the grooves of the mold plate 14 and of the hopper bottom 11 is illustrated particularly in Figs. 2 and 4. In Fig. 2 there is also illustrated a means, generally designated by the numeral 21, for driving the means for discharging plastic material from the hopper 10. As illustrated in Fig. 4, the ridges 25 which lie between the grooves 13a of the hopper bottom 11, fit into the grooves 13b of the mold plate 14, and the ridges 26 of the mold plate 14 fit into the grooves 13a of the hopper bottom 11.

The improved device of the present invention operates in a manner quite similar to that of the unimproved device of U.S. Patent No. 2,530,062. In the formation of meat patties, meat is discharged through the bottom opening 12 of the hopper 10 into the opening 24 of the mold plate until that opening is completely filled. The mold plate 14 then is moved by the means 17 to the position illustrated in Fig. 1, that is to the position wherein the meat patty is discharged by the discharging means 23 from the mold opening onto the stack of paper sheets 18. The mold plate 14 then is moved back to the position beneath the hopper opening 12 and is ready to receive another quantity of meat into the mold plate opening 24. As the mold plate 14 moves from the position beneath the hopper, the upper surface of the meat within the mold opening 24 is forced to conform to the configuration of the hopper bottom 11, thus giving to the meat an attractive, non-planar or ridged surface configuration of appreciably greater surface area than the surface provided by the unimproved device.

The invention has been shown to describe in a particular embodiment although it is to be understood that the invention is capable of many modifications. Such changes and modifications may generally be made without departing from the spirit and scope of the invention as described in the following claim.

I claim:

In a device for molding a patty from plastic material wherein the plastic material is discharged from a hopper into a slidable mold plate which is in contact with said hopper, the improvement which comprises a slidable mold plate having a plurality of ridges and grooves in the upper surface thereof which is in contact with the hopper, said ridges and said grooves extending parallel to the direction in which said slidable mold plate may be caused to move, said hopper having a surface thereof which is in contact with said mold plate provided with a plurality of ridges and grooves, the ridges of said mold plate being fitted into the grooves of said hopper surface and the ridges of said hopper surface being fitted into the grooves of said mold plate surface.

References Cited in the file of this patent

UNITED STATES PATENTS

| | | |
|---|---|---|
| 2,530,062 | Holly | Nov. 14, 1950 |
| 2,806,247 | Shadid | Sept. 17, 1957 |
| 2,808,614 | Renfrow | Oct. 8, 1957 |
| 2,832,093 | Whitaker | Apr. 29, 1958 |